United States Patent
Watanabe et al.

(10) Patent No.: US 7,671,892 B2
(45) Date of Patent: Mar. 2, 2010

(54) IMAGE SENSING APPARATUS, AND CONTROL METHOD, PROGRAM, AND STORAGE MEDIUM OF IMAGE SENSING APPARATUS

(75) Inventors: Yoshinori Watanabe, Tokyo (JP); Yoshihiro Honma, Asaka (JP); Yoshinobu Sato, Yokohama (JP); Masato Kosugi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 342 days.

(21) Appl. No.: 11/750,755

(22) Filed: May 18, 2007

(65) Prior Publication Data

US 2007/0285521 A1   Dec. 13, 2007

(30) Foreign Application Priority Data

Jun. 2, 2006   (JP)   ............................. 2006-155399

(51) Int. Cl.
*H04N 5/228* (2006.01)
*G06K 9/46* (2006.01)

(52) U.S. Cl. ................................... 348/208.6; 382/236

(58) Field of Classification Search . 348/208.99–208.7; 396/52–55; 382/236
See application file for complete search history.

(56) References Cited

U.S. PATENT DOCUMENTS

| | | | | |
|---|---|---|---|---|
| 5,754,226 | A * | 5/1998 | Yamada et al. ........... | 348/219.1 |
| 6,744,931 | B2 * | 6/2004 | Komiya et al. .............. | 382/284 |
| 6,876,387 | B1 * | 4/2005 | Lee .......................... | 348/240.2 |
| 6,952,234 | B2 * | 10/2005 | Hatano ........................ | 348/363 |
| 7,057,645 | B1 * | 6/2006 | Hara et al. ............... | 348/208.6 |
| 2006/0023090 | A1 * | 2/2006 | Takata et al. ................ | 348/239 |
| 2006/0132612 | A1 * | 6/2006 | Kawahara ................ | 348/208.6 |

FOREIGN PATENT DOCUMENTS

| | | |
|---|---|---|
| JP | 2003-259208 | 9/2003 |
| JP | 2005-328326 | 11/2005 |

\* cited by examiner

*Primary Examiner*—Sinh Tran
*Assistant Examiner*—Mark Monk
(74) *Attorney, Agent, or Firm*—Cowan, Liebowitz & Latman, P.C.

(57) ABSTRACT

An image sensing apparatus according to the present invention includes: an image sensing unit configured to sense an object image and output image signals; a shift amount detecting unit configured to detect a shift amount between two image signals, from the image signals that are sequentially output by the image sensing unit; an image signal synthesizing unit configured to sequentially synthesize the image signals based on detection results of the shift amount detecting unit, and generate a synthesized image signal that has been corrected by the shift amount; and a memory unit configured to accumulate the synthesized image signal, wherein the image signal synthesizing unit performs level adjustment of a signal level, the level adjustment varying for each area of the two image signals that are to be synthesized, and generates the synthesized image signal.

2 Claims, 13 Drawing Sheets

IMAGE SENSING APPARATUS, AND CONTROL METHOD, PROGRAM, AND STORAGE MEDIUM OF IMAGE SENSING APPARATUS

BACKGROUND OF THE INVENTION

1. Field of the Invention

The present invention relates to an image sensing apparatus having a camera shake detection function and a camera shake correction function, and a control method, a program, and a storage medium of the image sensing apparatus.

2. Description of the Related Art

It is conventionally known that in an image sensing apparatus such as a digital camera, the shift amount due to camera shake is detected by photographing a plurality of frame images, and correlating data of the obtained frame images. In this case, it has been also proposed that the data of the plurality of frame images be synthesized while being shifted based on the detection results, thereby performing electronic camera shake correction for correcting blurring of an image caused by camera shake. In contrast to an optical camera shake correction system, in this type of electronic camera shake correction, an optical system drive section for driving an optical system is not necessary, and thus the image sensing apparatus can be made smaller.

For example, as shown in FIG. 11, in a proposed electronic camera shake correction system, the image sensing apparatus is provided with a first memory 200 and a second memory 202. A calculating section 201 detects a motion vector of an object image in a characteristic area between frame image data 203 successively photographed and respectively accumulated in the first memory 200 and the second memory 202. The thus detected motion vector is output from a motion vector output section 204. Then, as shown in FIG. 12, sequentially captured frame image data is subjected to an adding process while being shifted in the direction opposite to the camera shake direction based on the detected motion vector. Japanese Patent Laid-Open No. 2005-328326 has disclosed a technique for obtaining, in a synthesizing memory 205, image data for one frame on which the camera shake correction has been performed.

A plurality of frame memories is necessary in the electronic camera shake correction illustrated in FIG. 11. However, it is also possible that as shown in FIG. 13, in a memory 300 having a frame memory area larger than one frame, a plurality of frame image data that have been sequentially captured are superimposed one on another while being shifted based on camera shake shift information obtained by a shift amount detecting device. Japanese Patent Laid-Open No. 2005-328326 has disclosed a technique for performing camera shake correction with one image synthesizing memory.

In the electronic camera shake correction, one frame image data is obtained from a plurality of frame image data that have been obtained by photographing an image by performing a plurality of exposures. Thus, it is necessary to adjust the signal level when synthesizing the plurality of frame image data. For example, Japanese Patent Laid-Open No. 2003-259208 has disclosed a technique for performing camera shake correction by synthesizing a plurality of sequentially shot frame image data whose signal level has been adjusted.

In Japanese Patent Laid-Open No. 2005-328326, a plurality of frame image data are superimposed one on another while being shifted based on the results of camera shake detection. Thus, in a case where images are shot at underexposure, the signal level varies depending on how the frame image data are superimposed. Accordingly, when extracting image data whose signal level has been corrected, the area from which images can be extracted is limited. Furthermore, even in a case where images are captured while exposure is made appropriate for each frame image, the signal level for each frame image data is low, because the images are photographed by performing a plurality of exposures in a short time. Thus, even if the signal level is increased in order to make the signal level of the image data appropriate, the S/N of each image data is low, and noise components are amplified in the corrected image data that is to be extracted.

In Japanese Patent Laid-Open No. 2003-259208, in image synthesis, image data are synthesized while the signal level is adjusted. At that time, the plurality of frame image data that have been sequentially captured are added while being shifted for camera shake correction. Thus, as in Japanese Patent Laid-Open No. 2005-328326, the number of image data superimposed varies from image area to image area, and the signal level is not uniform throughout the entire area of the synthesized image. Thus, image data that can be extracted at the same signal level has a size smaller than the effective pixel area.

SUMMARY OF THE INVENTION

It is an aspect of the present invention to provide an image sensing apparatus that is provided with a camera shake correction function to perform image synthesis at a uniform level throughout the entire area of images that are to be synthesized for camera shake correction.

In order to achieve the above-described aspect, an image sensing apparatus according to an embodiment of the present invention includes:

an image sensing unit configured to sense an object image and output image signals;

a shift amount detecting unit configured to detect a shift amount between two image signals, from the image signals that are sequentially output by the image sensing unit;

an image signal synthesizing unit configured to sequentially synthesize the image signals based on detection results of the shift amount detecting unit, and generate a synthesized image signal that has been corrected by the shift amount; and a memory unit configured to accumulate the synthesized image signal, wherein the image signal synthesizing unit performs level adjustment of a signal level, the level adjustment varying for each area of the two image signals that are to be synthesized, and generates the synthesized image signal.

In order to achieve the above-described aspect, a control method of an image sensing apparatus according to another embodiment of the present invention includes:

an area information generating step adapted to generate, in a memory unit, first area information indicating an area on which the image signal output in the image sensing step is superimposed, and second area information indicating the entire area of the synthesized image signal accumulated in the accumulating step, based on the detection results in the shift amount detecting step, wherein when the number of shootings is taken as N, in the image signal synthesizing step:

the level adjustment is performed in which the image signal output in the image sensing step is multiplied by $N/(N-1)$, in an area that is inside the area indicated by the second area information and outside the area indicated by the first area information;

the level adjustment is performed in which the image signal output in the image sensing step is multiplied by N, in an area that is inside the area indicated by the first area information and does not overlap with the synthesized image signal accumulated in the memory unit; and the image signal output in the image sensing step and the synthesized image signal are synthesized, in an area that is inside the area indicated by the first area information and overlaps with the synthesized image signal accumulated in the memory unit.

In order to achieve the above-described aspect, another embodiment of the present invention provides a program for causing a computer to execute steps of the control method of an image sensing apparatus in the foregoing embodiment.

In order to achieve the above-described aspect, another embodiment of the present invention provides a computer-readable storage medium storing a program for causing a computer to execute steps of the control method of an image sensing apparatus in the foregoing embodiment.

According to the present invention, camera shake correction is possible in which images can be synthesized such that the signal level is uniform throughout the entire area of a synthesized image obtained for camera shake correction.

Further features of the present invention will become apparent from the following description of exemplary embodiments with reference to the attached drawings.

DESCRIPTION OF THE EMBODIMENTS

Embodiment 1

Figure 1:
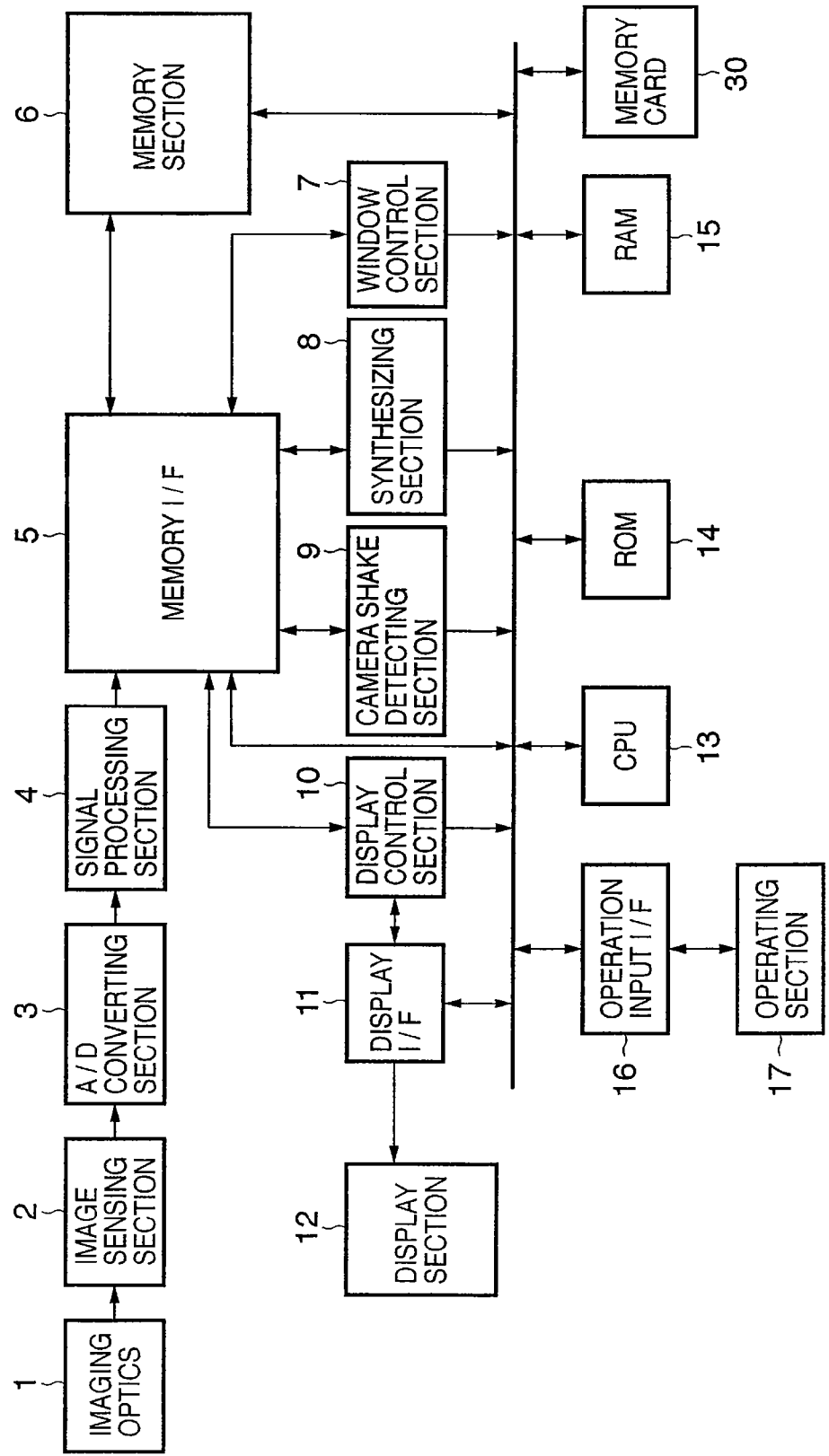
FIG. 1 is a block diagram of an image sensing apparatus in Embodiment 1 of the present invention.
Figure 2:
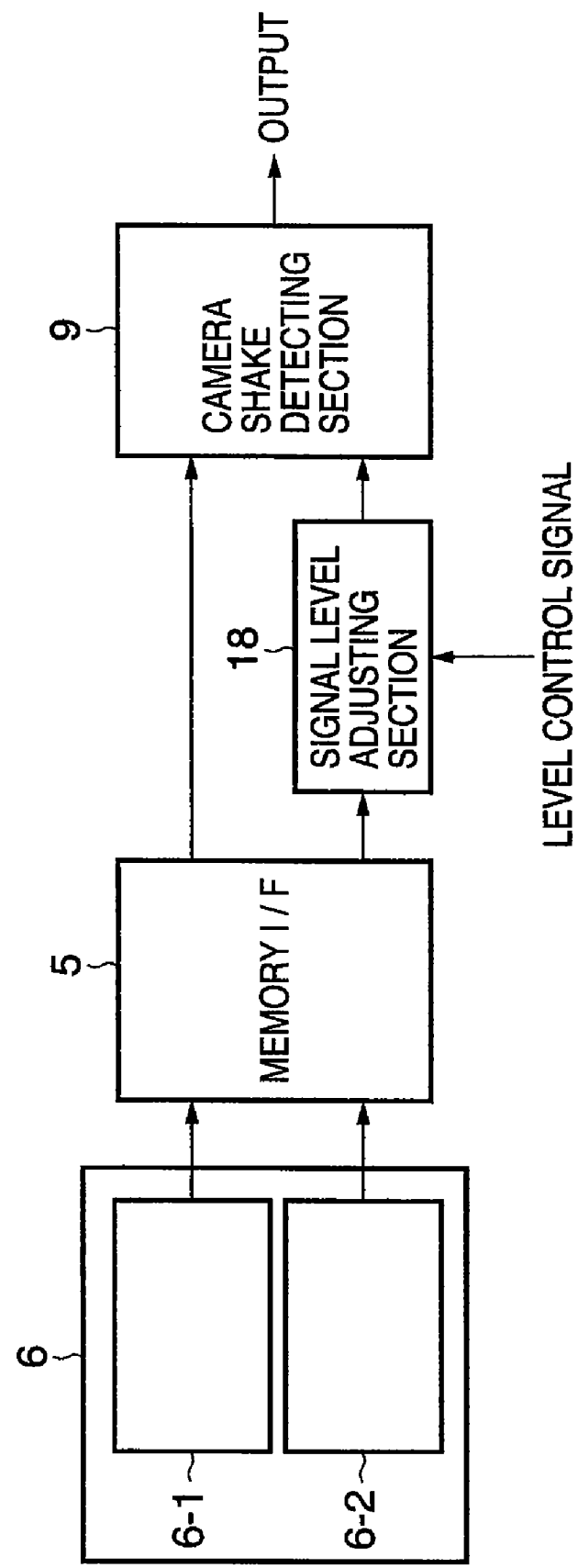
FIG. 2 is a block diagram illustrating the functions of signal level adjustment that is performed in camera shake detection in the image sensing apparatus in Embodiment 1 of the present invention.
Figure 5:
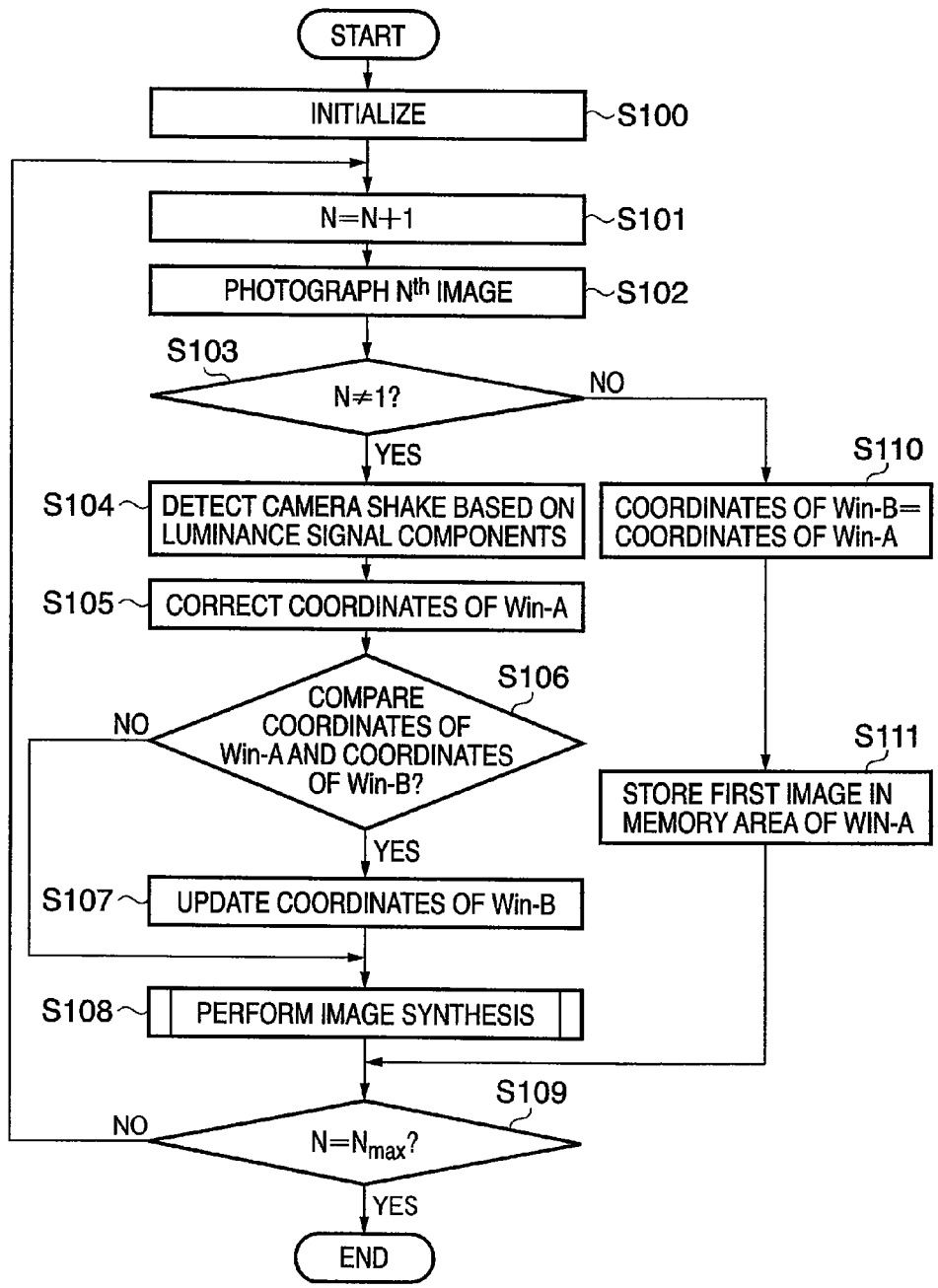
FIG. 5 is a flowchart illustrating steps of camera shake detection in the image sensing apparatus in Embodiment 1 of the present invention.
Figure 8:
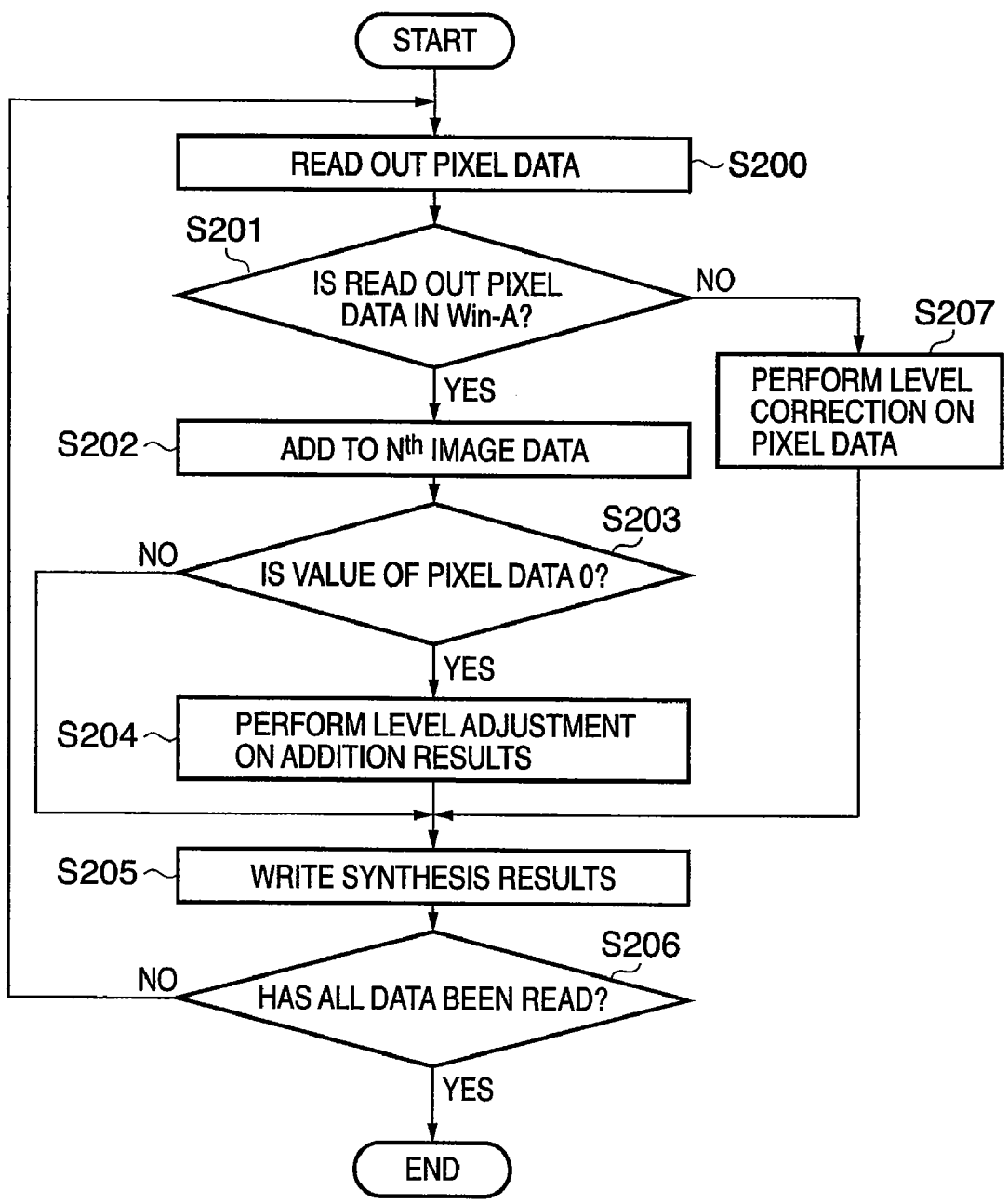
FIG. 8 is a flowchart illustrating steps of image synthesis in the image sensing apparatus in Embodiment 1 of the present invention.

FIG. 1 shows a block diagram of an image sensing apparatus in Embodiment 1 of the present invention. FIG. 5 is a flowchart illustrating steps performed by a camera shake detecting section 9 and a window control section 7 in the image sensing apparatus of Embodiment 1. FIG. 8 is a flowchart illustrating steps performed by a synthesizing section 8. In FIG. 1, an object image that is incident via an imaging optics 1 is photoelectrically converted into an electric signal by an image sensor in an image sensing section 2. An A/D converting section 3 converts the image signal that has been output from the image sensing section 2 into digital image data. A signal processing section 4 includes a white-balance circuit, a gamma-correction circuit, a matrix-conversion circuit, and the like in order to convert the image data that has been output from the A/D converting section 3 into image data in a YUV data format that is used in a camera shake detecting section 9 (described later). The image data that has been output from the signal processing section 4 is transmitted via a memory I/F 5 and temporarily stored in a memory section 6. Herein, as shown in FIG. 2, the memory section 6 has at least two memory areas, that is, a frame memory area 6-1 and a synthesizing frame memory area 6-2. In Embodiment 1, the synthesizing frame memory area 6-2 is set to be larger than the frame memory area 6-1.

When the number of shootings is taken as N (N is a positive integer of 2 or larger), the frame memory area 6-1 stores $N^{th}$ image data, and the synthesizing frame memory area 6-2 stores synthesized image data obtained by synthesizing a plurality of image data up to $(N-1)^{th}$ image data. The camera shake detecting section 9 extracts partial areas of the $N^{th}$ image data that is stored in the frame memory area 6-1 of the memory section 6, and partial areas of image data as the $(N-1)^{th}$ image data from the synthesized image data that is stored in the synthesizing frame memory area 6-2. Based on the image data of the extracted partial areas, the image shift amount of the image data due to camera shake is obtained.

Basically, the amount of camera shake of image data is detected by detecting a motion vector. The amount of camera shake of the image sensing apparatus is obtained by dividing the screen into a plurality of areas, and then obtaining the shift amount of the entire screen by performing statistical processing, for example, averaging the local shift amounts of the object image in the respective areas. At that time, the image data as the $(N-1)^{th}$ image data that is input to the camera shake detecting section 9 is extracted from the synthesized image data, and thus its luminance level, that is, signal level is different from that of the $N^{th}$ image data.

Thus, in a case where the synthesized image data is data obtained by simply synthesizing signals in this manner without taking the signal level into consideration, the image data extracted as the $(N-1)^{th}$ image data is input to the camera shake detecting section 9 after the signal level has been multiplied by $1/(N-1)$ to be lowered. Hereinafter, these operations are described with reference to FIG. 2. The $N^{th}$ image data is transmitted from the frame memory area 6-1 via the memory I/F 5 and input to the camera shake detecting section 9. On the other hand, the image data as the $(N-1)^{th}$ image data from an area in the synthesizing frame memory area 6-2 is transmitted, via the memory I/F 5 and then a signal level adjusting section 18, and input to the camera shake detecting section 9. The signal level adjusting section 18 inputs the image data as the $(N-1)^{th}$ image data to the camera shake detecting section 9 after lowering the signal level by multiplying it by 1/(N−1). The signal level adjusting section 18 has a function to adjust the signal level in response to a level control signal from a CPU 13.

Camera shake detection is performed between two image data whose signal levels have been matched in this manner. The information regarding the image data shift amount due to camera shake that has been obtained by the camera shake detecting section 9 is sent to the CPU 13. Based on this shift amount information, the window control section 7 sets a window (window Win-A) for displaying a memory area in which the $N^{th}$ image data transmitted via the memory I/F 5 is superimposed in an area in the synthesizing frame memory area 6-2 of the memory section 6. The window control section 7 also sets a window (window Win-B) for displaying the entire area of the synthesized image data. Hereinafter, these operations are described with reference to FIG. 3. The synthesizing section 8 functionally has a signal level adjusting section 19 and an adding section 20. The $N^{th}$ image data is transmitted from the frame memory area 6-1 via the memory I/F 5 and input to the synthesizing section 8. On the other hand, the image data as the $(N-1)^{th}$ image data from an area in the synthesizing frame memory area 6-2 is transmitted via the memory I/F 5 and input to the synthesizing section 8. When these two image data are added, the $(N-1)^{th}$ image data from the area in the synthesizing frame memory area 6-2 is input to the adding section 20 after the signal level has been multiplied by 1/(N−1) by the signal level adjusting section 19. With this process, the signal levels of the two image data that are to be synthesized are matched, and the synthesized image data is transmitted from the adding section 20 via the memory I/F 5 and rewritten to the area in the synthesizing frame memory area 6-2 of the memory section 6.

Referring back to FIG. 1, the image sensing apparatus of Embodiment 1 in FIG. 1 is further provided with a display control section 10, a display I/F 11, and a display section 12. The display section 12 can display image data that has not been photographed yet, and image data that has been photographed and accumulated in the memory section 6. Furthermore, the image sensing apparatus is provided with a ROM 14 storing various programs for causing the CPU 13 to operate, and a RAM 15 serving as a work memory of the operation of the CPU 13. Moreover, an operating section 17 used by the user to perform various adjustments, switching operations, shutter operations, and the like is connected via an operation input I/F 16 to the CPU 13. The image sensing apparatus operates following the programs stored in the ROM 14. Regardless of the operational relationship, the CPU 13 can control various signal processes, and operations according to embodiments of the present invention. Furthermore, a detachable memory card 30 constituted by a flash memory or the like is provided, and thus image data that has been accumulated in the memory section 6 can be sequentially accumulated.

Figure 4:
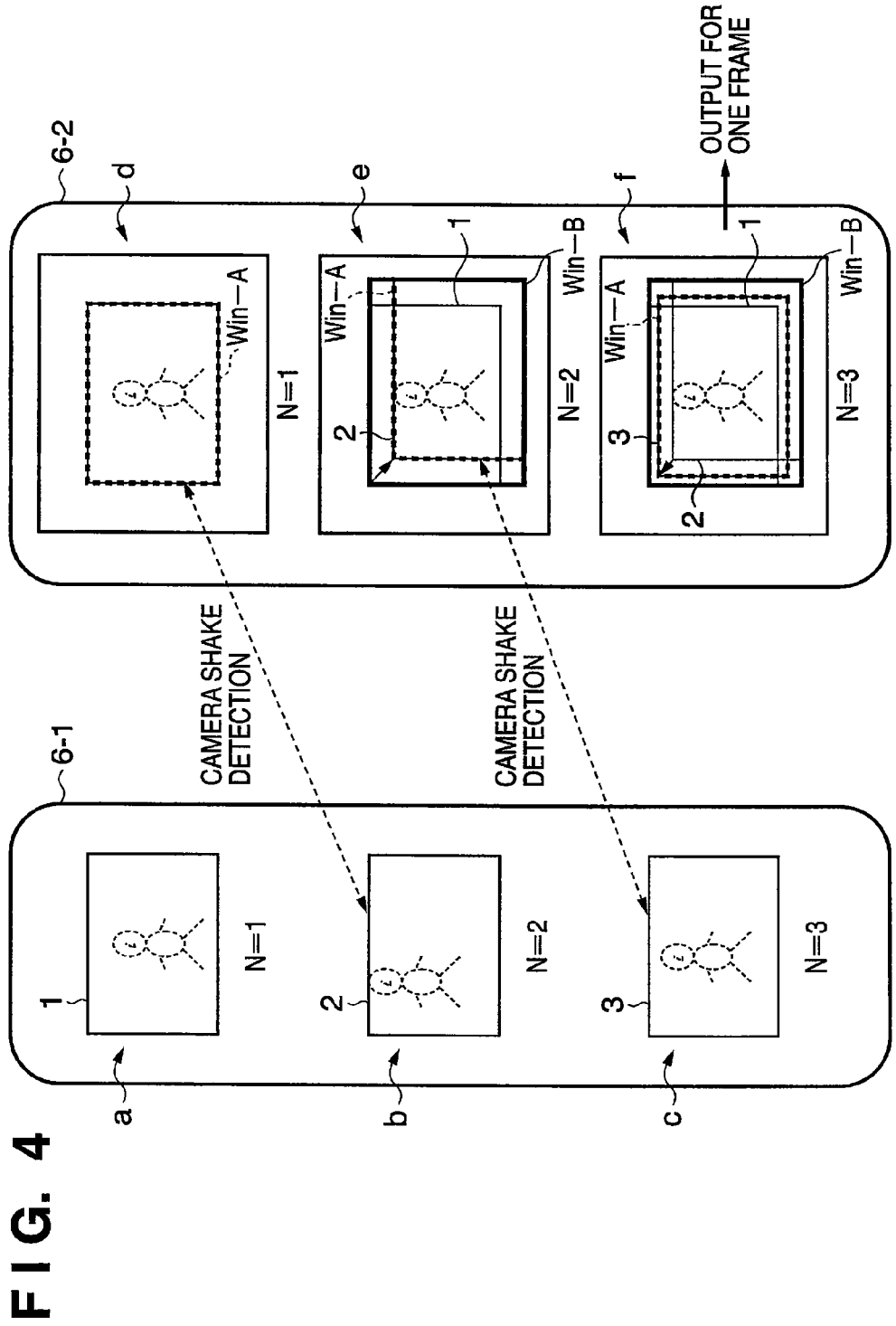
FIG. 4 is a diagram for illustrating the operation of camera shake detection in the image sensing apparatus in Embodiment 1 of the present invention.

FIG. 4 shows a diagram for illustrating the operation of the two windows that are set in the frame memory area 6-1 and the synthesizing frame memory area 6-2 of the memory section 6. First, in the frame memory area 6-1 in FIG. 4, as indicated by the symbols a and d, first image data (N=1) that has been shot and stored is transmitted from the frame memory area 6-1 and stored in the synthesizing frame memory area 6-2. The memory area in which the image data is to be stored is defined as the window Win-A that has been set in advance.

Next, as indicated by the symbol b, second image data (N=2) that has been obtained in second shooting is stored in the frame memory area 6-1. Then, camera shake detection is performed between the second image data stored in the frame memory area 6-1 indicated by the symbol b, and the image data in the window Win-A of the synthesizing frame memory area 6-2 indicated by the symbol d. Based on the results of this camera shake detection, the position of the window Win-A is shifted in a direction for camera shake correction, as shown in the synthesizing frame memory area 6-2 indicated by the symbol e. As the window Win-A is shifted, the memory area of the window Win-B is expanded as indicated by the solid line with the symbol e in FIG. 4.

Next, the second image data stored in the frame memory area 6-1 indicated by the symbol b is superimposed and accumulated on the window Win-A of the synthesizing frame memory area 6-2 indicated by the symbol e. The manner in which the image data is superimposed at that time is described in detail together with the synthesizing method (described later).

Figure 3:
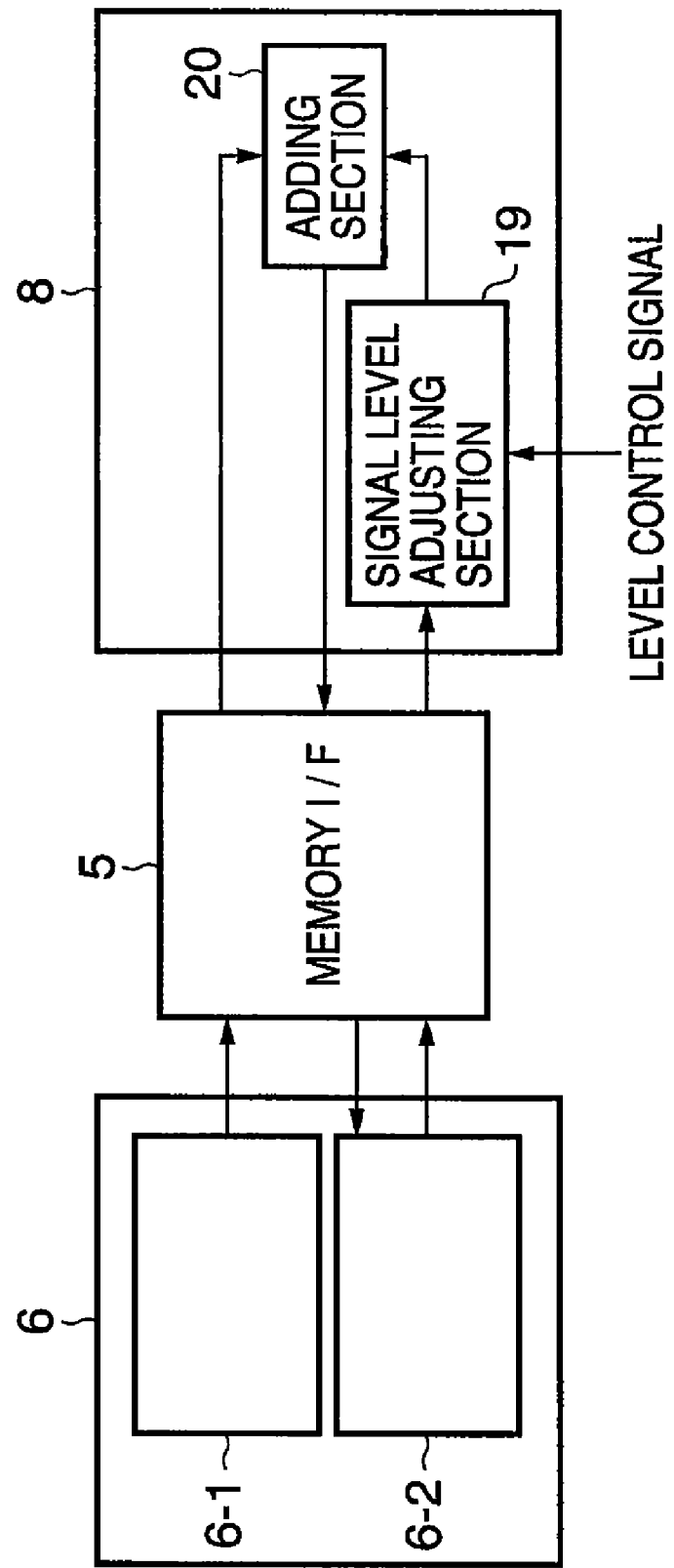
FIG. 3 is a block diagram illustrating the functions of signal level adjustment that is performed in image synthesis in the image sensing apparatus in Embodiment 1 of the present invention.

Next, as shown in the frame memory area 6-1 indicated by the symbol c, third image data (N=3) that has been obtained in third shooting is stored in the frame memory area 6-1. Then, camera shake detection is performed between the image data in the frame memory area 6-1 indicated by the symbol c, and the image data in the window Win-A of the synthesizing frame memory area 6-2 indicated by the symbol e. Based on the detection results, the position of the window Win-A is shifted as shown in the synthesizing frame memory area 6-2 indicated by the symbol f. As the window Win-A is shifted, the memory area of the window Win-B is expanded. Then, the third image data stored in the frame memory area 6-1 indicated by the symbol c is superimposed and accumulated on the window Win-A of the synthesizing frame memory area 6-2 indicated by the symbol f. Subsequently, the same process is repeated until the number of exposures N that has been set by the user is reached. In FIG. 4, the frame memory area 6-1 and the synthesizing frame memory area 6-2 seem to each have the memory area for three frames. However, this is only for illustrating the operation. As shown in FIGS. 2 and 3, the frame memory area 6-1 and the synthesizing frame memory area 6-2 are basically set to each have the memory area for one frame.

Next, the steps performed by the window control section 7 in the image sensing apparatus in Embodiment 1 of the present invention are described with reference to FIGS. 5 and 6A to 6C.

Figure 6A:
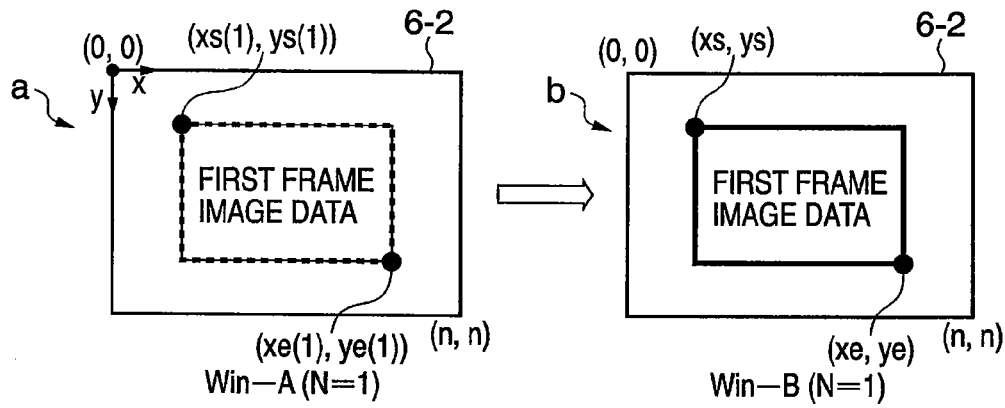
FIGS. 6A to 6C are diagrams for illustrating the operation of image synthesis in the image sensing apparatus in Embodiment 1 of the present invention.
Figure 6B:
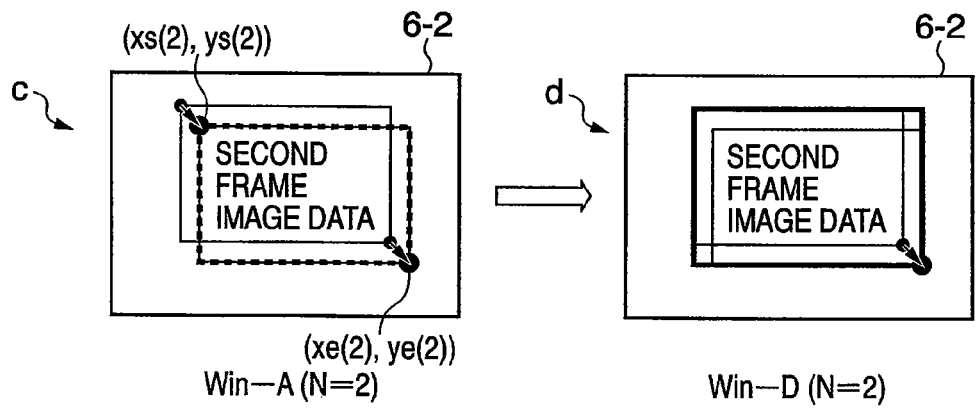
Figure 6C:
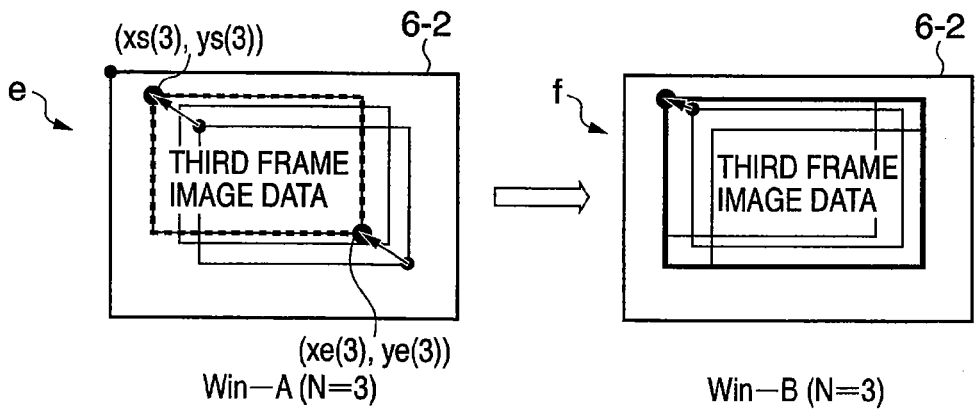

First, FIGS. 6A to 6C are described. FIGS. 6A to 6C are diagrams for illustrating the memory area of the synthesizing frame memory area 6-2 in the memory section 6.

The window control section 7 sets two windows in the memory area of the synthesizing frame memory area 6-2 in the memory section 6. One window is a window displaying the area of the $N^{th}$ image data that is superimposed on the $(N-1)^{th}$ image data at a shifted position based on the results of camera shake detection, and is referred to as the "window Win-A" in Embodiment 1. The other window is a window displaying the area of the synthesized image data, and is referred to as the "window Win-B" in this embodiment. The window Win-B is a window in which the area size is changed as indicated by the solid line, as the area of the synthesized image data is expanded when the $N^{th}$ image data is superimposed.

Next, the relationship between the windows is described in detail. First, as shown in FIG. 6A indicated by the symbol a, the memory area of the synthesizing frame memory area 6-2 is set to have the upper left coordinates (0, 0) and the lower right coordinates (n, n) (n≧0).

In the initial condition, the coordinates of the window Win-A have been initialized such that the window Win-A serves as a window displaying the area in which the first image data is stored. For example, as shown in FIG. 6A indicated by the symbol a, the window Win-A is set to have the upper left coordinates (xs(1), ys(1)) and the lower right coordinates (xe(1), ye(1)).

Furthermore, as shown in FIG. 6A indicated by the symbol b, the window Win-B is set to have the upper left coordinates (Xs, Ys) and the lower right coordinates (Xe, Ye). Herein, the window Win-B serves as a window displaying the area of synthesized image data, but its coordinates are set to be the same as the initial coordinates of the window Win-A for the first image data.

More specifically, $Xs = xs(1) \ldots (a)$, $Ys = ys(1) \ldots (b)$, $Xe = xe(1) \ldots (c)$, and $Ye = ye(1) \ldots (d)$.

The coordinates of the window Win-B are updated when the area of the synthesized image data is expanded as image data is superimposed. In this embodiment, the coordinates are updated if the following conditions are satisfied.

More specifically, if $xs(N) < Xs$, then assign xs(N) into Xs $\ldots$ (e), if $ys(N) < Ys$, then assign ys(N) into Ys $\ldots$ (f), if $xe(N) > Xe$, then assign xe(N) into Xe $\ldots$ (g), and if $ye(N) > Ye$, then assign ye(N) into Ye $\ldots$ (h).

Next, the change of the windows when the second image data is captured is described. When the second image data is captured, the camera shake detecting section 9 detects the amount of camera shake based on the image data in the area of the window Win-A and the second image data. Herein, the window Win-A displays the area in which the first image data is disposed.

The camera shake detecting section 9 detects camera shake in the following method. First, image data constituted only by luminance signal components is divided into a plurality of areas. Then, the shift amount of the entire screen is obtained by performing statistical processing, for example, averaging the local shift amounts of the object image in the respective areas. Thus, the amount of camera shake of the image sensing apparatus is obtained.

Based on the obtained amount of camera shake, the window Win-A is set to be an area that has been shifted from the first image data. For example, as shown in FIG. 6B indicated by the symbol c, correction is performed such that the second image data is superimposed at the position that has been shifted from the first image data in the lower right direction. At that time, the window Win-A is set to have the upper left coordinates (xs(2), ys(2)) and the lower right coordinates (xe(2), ye(2)).

Herein, in order to satisfy the conditions:

$xe(2) > Xe \ldots (i)$; and $ye(2) > Ye \ldots (j)$,

Xe and Ye are respectively set to xe(2) and ye(2) for the window Win-B. Thus, as shown in FIG. 6B indicated by the symbol d, the coordinates of the window Win-B are updated such that the window Win-B serves as a window displaying the entire area in which the first and second image data is disposed.

Next, the change of the windows when the third image data is captured is described. When the third image data is captured, the camera shake detecting section 9 detects the amount of camera shake based on the image data in the area of the window Win-A and the third image data. Herein, the window Win-A displays the area in which the second image data is disposed.

Based on the detected camera shake amount, the window Win-A is set to be an area that has been shifted from the second image data. For example, as shown in FIG. 6C indicated by the symbol e, correction is performed such that the third image data is superimposed at the position that has been shifted from the second image data in the upper left direction. At that time, the window Win-A is set to have the upper left coordinates (xs(3), ys(3)) and the lower right coordinates (xe(3), ye(3)).

Herein, in order to satisfy the conditions:

$xs(3) < Xs \ldots (k)$;

$ys(3) < Ys \ldots (l)$,

Xs and Ys are respectively set to xs(3) and ys(3) for the window Win-B. Thus, as shown in FIG. 6C indicated by the symbol f, the coordinates of the window Win-B are updated such that the window Win-B serves as a window displaying the entire area in which the synthesized image data and the third image data are arranged. This process is performed for the number of shootings N.

Next, the steps of the window control are described with reference to the flowchart in FIG. 5. In FIG. 5, first, an initialization process is performed in step S100. In the initialization process, the coordinates indicating the position of the window Win-A are initialized, and the values of the entire memory area of the synthesizing frame memory area 6-2 are initialized to be 0. Furthermore, the number of frame images at which the user performs the camera shake correction is set to $N_{max}$. In the initial condition, the number of shootings N is 0. Next, the number of shootings N is set to N+1 in step S101, and the $N(=1)^{th}$ shooting is performed in step S102. In step S103, it is determined that the number of shootings is 1, or 2 or more. If the number of shootings is 1, then the procedure proceeds to step 110, where the coordinates of the window Win-A are input to the coordinates indicating the position of the window Win-B.

Next, in step S111, the first image data is stored in the area of the window Win-A. In step S103, if it is determined that the number of shootings is 2 or more, then the procedure proceeds to step S104. In step S104, camera shake detection is performed between the image data of the window Win-A displaying the area of the $(N-1)^{th}$ image data in the synthesized image and the $N^{th}$ image data that has been shot. At that time, only luminance signal components are used for the camera shake detection, and the image data read out from the window Win-A is input to the camera shake detecting section 9 after the signal level has been multiplied by 1/(N−1) for adjustment. These operations were functionally described with reference to the circuit configuration in FIG. 2.

Next, in step S105, as the camera shake correction of the coordinates of the window Win-A based on the results of the camera shake detection, the coordinates are corrected in the direction opposite to the direction of camera shake. In step S106, if it is determined that the window Win-A has been shifted to the outside of the window Win-B by this change of the coordinates, then the coordinates of the window Win-B are updated in step S107. If the window Win-A has not been shifted to the outside of the window Win-B, then the coordinates of the window Win-B are not updated. Herein, in Embodiment 1, if the following conditions are satisfied by the coordinates shown in FIG. 6B, then it is determined that the window Win-A has been shifted to the outside of the window Win-B, and the coordinates of the window Win-B are updated.

More specifically, the coordinates of the window Win-B are updated, if $xs(N)<Xs$, $ys(N)<Ys$, $xe(N)>Xe$, or $ye(N)>Ye$ ... (m).

Next, in step S108, the $N^{th}$ image data that has been shot is synthesized with the image data in the area of the window Win-A. This synthesizing method in step S108 is described later with reference to the flowchart in FIG. 8. In step S109, if the number of shootings N reaches $N_{max}$ that has been set by the user, then the process flow is stopped, and the process is ended. If the number of shootings N has not reached $N_{max}$, then the procedure returns to step S101, and the following process flow is repeated. Following this flow, two windows are set in the memory area of the synthesizing frame memory area 6-2. With these windows, the $(N-1)^{th}$ image data can be extracted from the synthesized image data, and camera shake detection can be performed between the $(N-1)^{th}$ image data and the $N^{th}$ image data.

Figure 7:
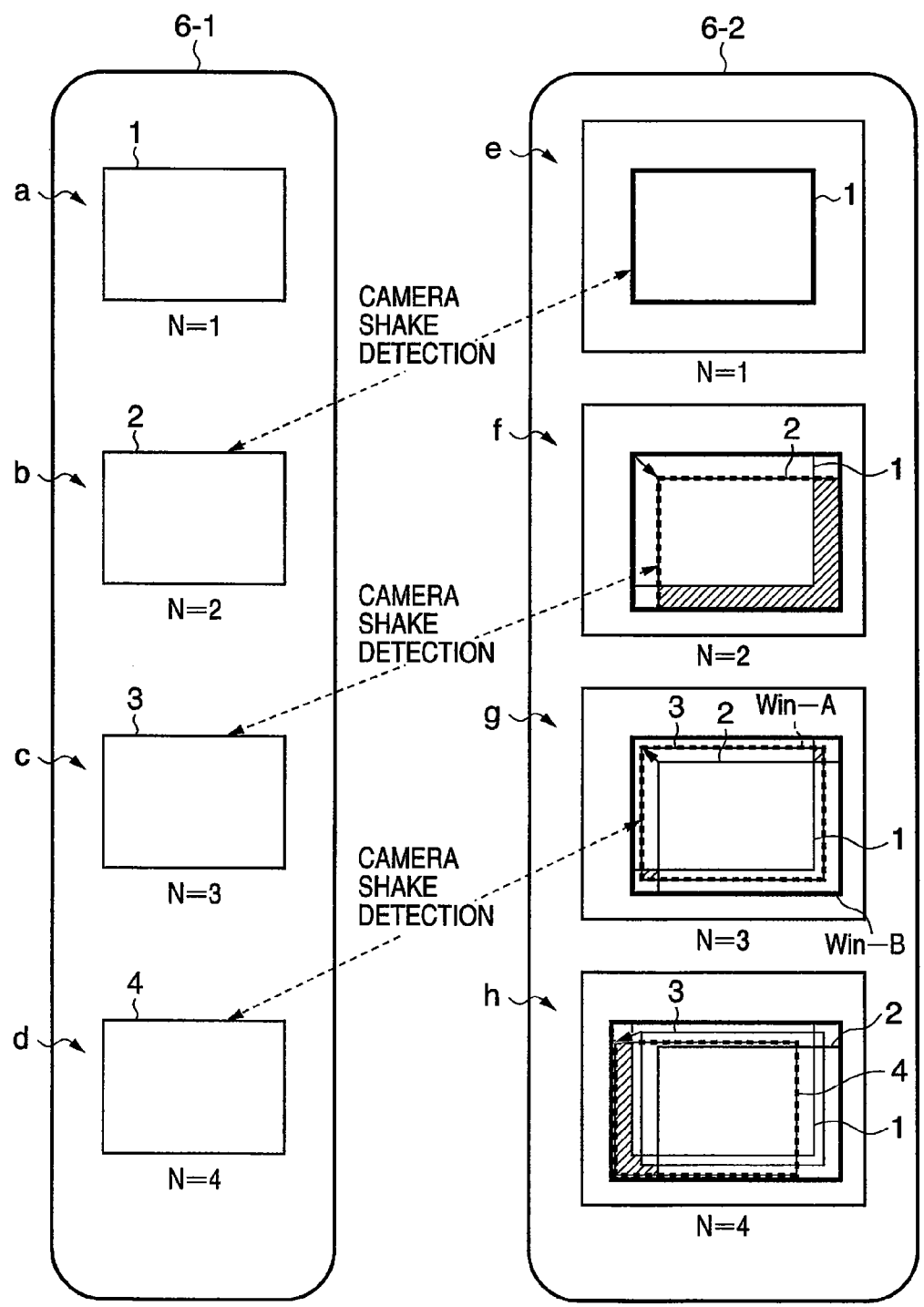
FIG. 7 is a diagram for illustrating the operation of window control in the image sensing apparatus in Embodiment 1 of the present invention.

Next, the image synthesizing process of this embodiment is described with reference to FIG. 7. FIG. 7 is a diagram expressing, as an image, the arrangement of image data in the frame memory area 6-1 and the synthesizing frame memory area 6-2 in the memory section 6 when synthesizing images. As illustrated in the flowchart in FIG. 5, the entire memory area of the synthesizing frame memory area 6-2 has been initialized to be 0.

As indicated by the symbol a in FIG. 7, in the first shooting, the first image data is displaced in the frame memory area 6-1. Then, this first image data is displaced in the area of the window Win-A in the synthesizing frame memory area 6-2, as indicated by the symbol e in FIG. 7.

Then, as indicated by the symbol b in FIG. 7, in the second shooting, the second image data is stored in the frame memory area 6-1. As indicated by the symbol f in FIG. 7, the second image data is synthesized at the window Win-A set at the position corrected by the camera shake shift amount from the first image.

In this synthesizing process, as indicated by the symbol f in FIG. 7, in an area that is inside the window Win-B and outside the window Win-A, data is stored after the signal level has been multiplied by $N/(N-1)$, that is, 2 for adjustment. In an area inside the window Win-A, if data of the synthesizing frame memory area 6-2 is 0, then the second image data is stored in the synthesizing frame memory area 6-2 after the signal level has been multiplied by N, that is, 2 for adjustment. This portion is hatched in FIG. 7. In an area inside the window Win-A, if data of the synthesizing frame memory area 6-2 is not 0, then the second image data and the image data stored in the synthesizing frame memory area 6-2 are synthesized and rewritten. With this process, even in an area in which the first and second image data is not superimposed, the signal level is adjusted, and thus images are synthesized at the same signal level throughout the entire area of the synthesized image data.

Then, as indicated by the symbol c in FIG. 7, in the third shooting, the third image data is stored in the frame memory area 6-1. As indicated by the symbol g in FIG. 7, the third image data is synthesized at the window Win-A set at the position corrected by the camera shake shift amount from the second image.

In this synthesizing process, as indicated by the symbol g in FIG. 7, in an area that is inside the window Win-B and outside the window Win-A, data is stored after the signal level has been multiplied by $N/(N-1)$, that is, 3/2 for adjustment. In an area inside the window Win-A, if data of the synthesizing frame memory area 6-2 is 0, then the third image data is stored in the synthesizing frame memory area 6-2 after the signal level has been multiplied by N, that is, 3. In an area inside the window Win-A, if data of the synthesizing frame memory area 6-2 is not 0, then the third image data and the data stored in the synthesizing frame memory area 6-2 are synthesized and rewritten. With this process, even in an area in which image data obtained by synthesizing image data up to the second image data, and the third image data are not superimposed, the signal level is adjusted, and thus images are synthesized at the same signal level throughout the entire area of the synthesized image data.

Then, as indicated by the symbol d in FIG. 7, in the fourth shooting, the fourth image data is stored in the frame memory area 6-1. As indicated by the symbol h in FIG. 7, the fourth image data is synthesized at the window Win-A set at the position corrected by the camera shake shift amount from the third image.

In this synthesizing process, as indicated by the symbol h in FIG. 7, in an area that is inside the window Win-B and outside the window Win-A, data is stored after the signal level has been multiplied by $N/(N-1)$, that is, 4/3 for adjustment. In an area inside the window Win-A, if data of the synthesizing frame memory area 6-2 is 0, then the fourth image data is stored in the synthesizing frame memory area 6-2 after the signal level has been multiplied by N, that is, 4. In an area inside the window Win-A, if data of the synthesizing frame memory area 6-2 is not 0, then the fourth image data and the data stored in the synthesizing frame memory area 6-2 are added and rewritten. With this process, even in an area in which image data obtained by synthesizing image data up to the third image data, and the fourth image data are not superimposed, the signal level is adjusted, and thus images are synthesized at the same signal level throughout the entire area of the synthesized image data. This process is performed for the number of shootings N.

In the description above, the signal level is adjusted by providing the signal level adjusting section 19 described in the configuration diagram in FIG. 3 with level control signals corresponding to various adjustment levels.

Figure 9:
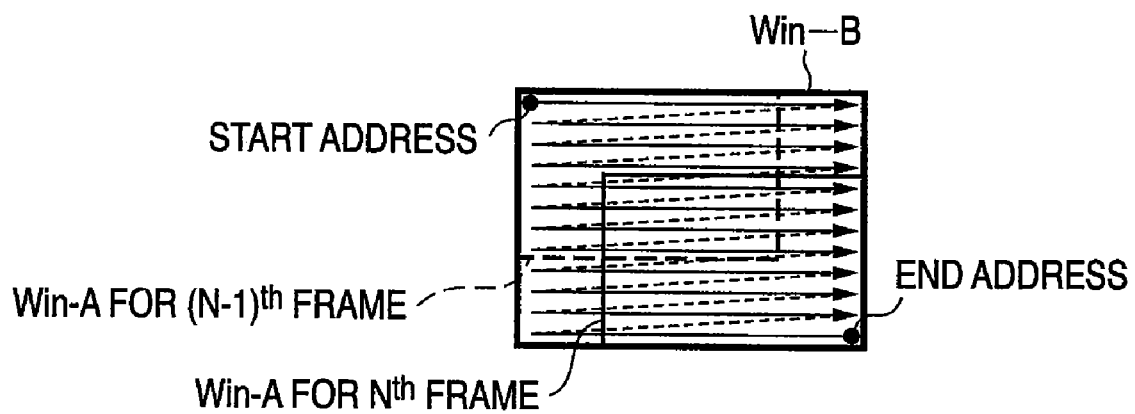
FIG. 9 is a diagram for illustrating an operation to read out image data in image synthesis in the image sensing apparatus in Embodiment 1 of the present invention.

The steps of the image synthesizing method are described with reference to FIGS. 8 and 9. In Embodiment 1, the image synthesizing process is performed in step S108 in FIG. 5. In step S200 in FIG. 8, image data is read out pixel by pixel from the area of the window Win-B. In Embodiment 1, as shown in FIG. 9, the image data is read out in the raster format sequentially from the start address on the upper left position in the area of the window Win-B. In step S201, it is determined whether or not the pixel data that has been read out from the area of the window Win-B is inside the area of the window Win-A. If the read out pixel data is outside the area of the window Win-A, then the procedure proceeds to step S207.

In step S207, the pixel data that has been read out from the area of the window Win-B is adjusted by multiplying the signal level by $N/(N-1)$, and then the procedure proceeds to step S205. In step S201, if it is determined that the pixel data that has been read out from the area of the window Win-B is inside the area of the window Win-A, then the procedure proceeds to step S202. In step S202, the read out pixel data and the $N^{th}$ image data are added.

Next, in step S203, it is determined whether or not the value of the pixel data that has been read out from the area of the window Win-B in step S200 is 0. If the value is 0, then the procedure proceeds to step S204. In step S204, the signal level of the pixel data is multiplied by N for adjustment, and then the procedure proceeds to step S205. In step S203, if it is determined that the value of the read out pixel data is not 0, then the procedure proceeds to step S205.

In step S205, the pixel data on which the adding process or level adjustment has been performed is rewritten to the same address as the address from which the pixel data has been read out, in the synthesizing frame memory area 6-2. Next, in step S206, it is determined whether or not all pixel data inside the area of the window Win-B has been read out. If it is determined that all pixel data has not been read out yet, then the procedure returns to step S200, and the following steps are repeated. In step S206, if it is determined that all pixel data inside the area of the window Win-B has been read out, then the process flow in FIG. 8 is stopped, and the process is ended. In the description above, the signal level of the pixels is adjusted by providing the signal level adjusting section 19 illustrated in FIG. 3 with level control signals corresponding to various adjustment levels.

With this process, in the image synthesizing process, images are synthesized while the signal level is adjusted, for each frame, at areas outside areas in which an adding process has been performed. Accordingly, the image data is stored at the signal level throughout the entire area of the synthesized image data, and thus the image data can be extracted from the area larger than one frame. The image signals on which the electronic camera shake correction has been thus performed are accumulated in the synthesizing frame memory area 6-2 as synthesized image signals. The synthesized image signals are displayed on the display section 12 and stored in the memory card 30.

Embodiment 2

In Embodiment 1, the camera shake detection was performed by obtaining the motion vector based on temporally-successive frame images. However, it is also possible to make the circuit configuration smaller using a mechanical device for the camera shake detection. In this case, it is conceivable to use the circuit configuration as shown in FIG. 10, for example.

Figure 10:
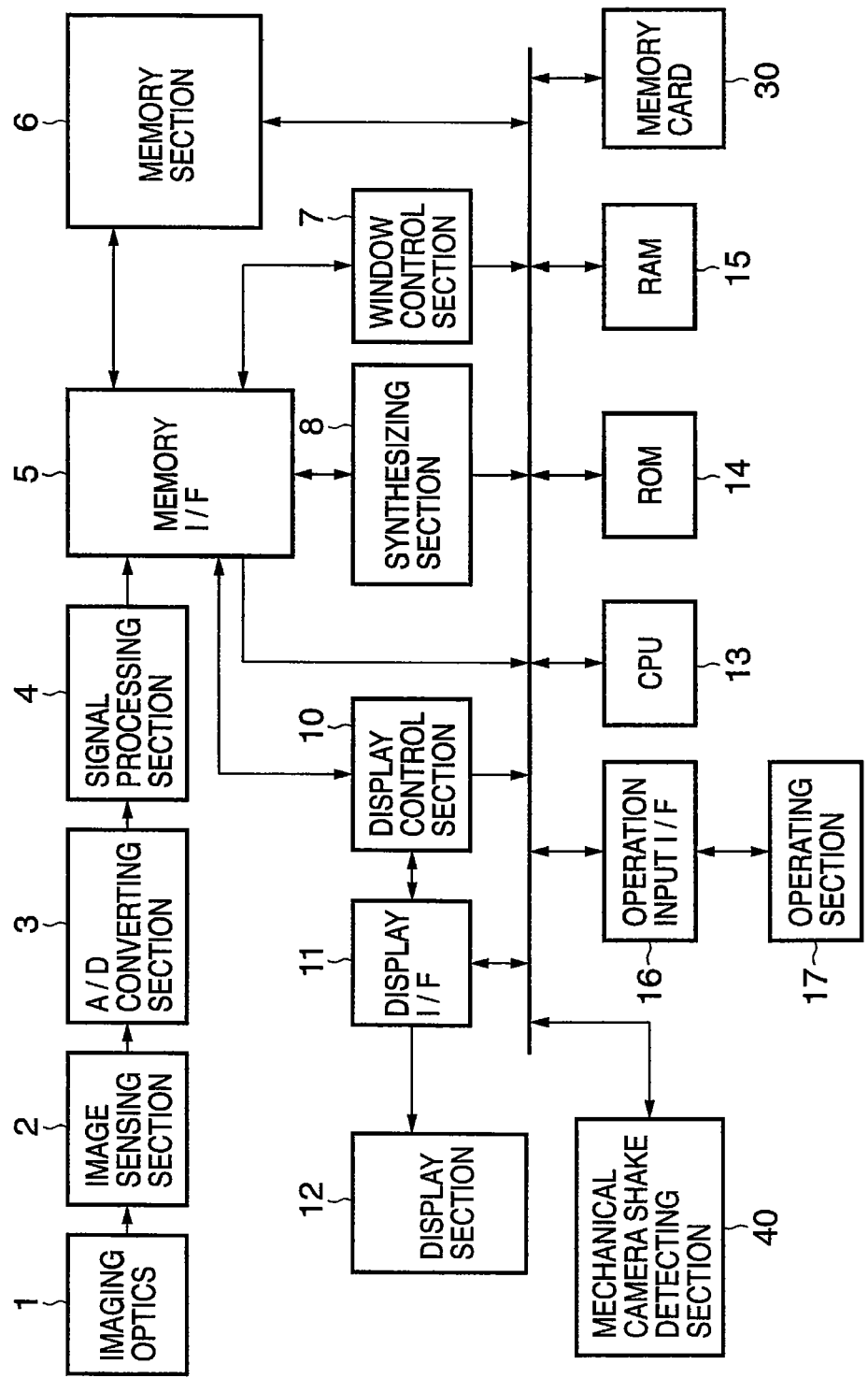
FIG. 10 is a block diagram of an image sensing apparatus in Embodiment 2 of the present invention.
Figure 11:
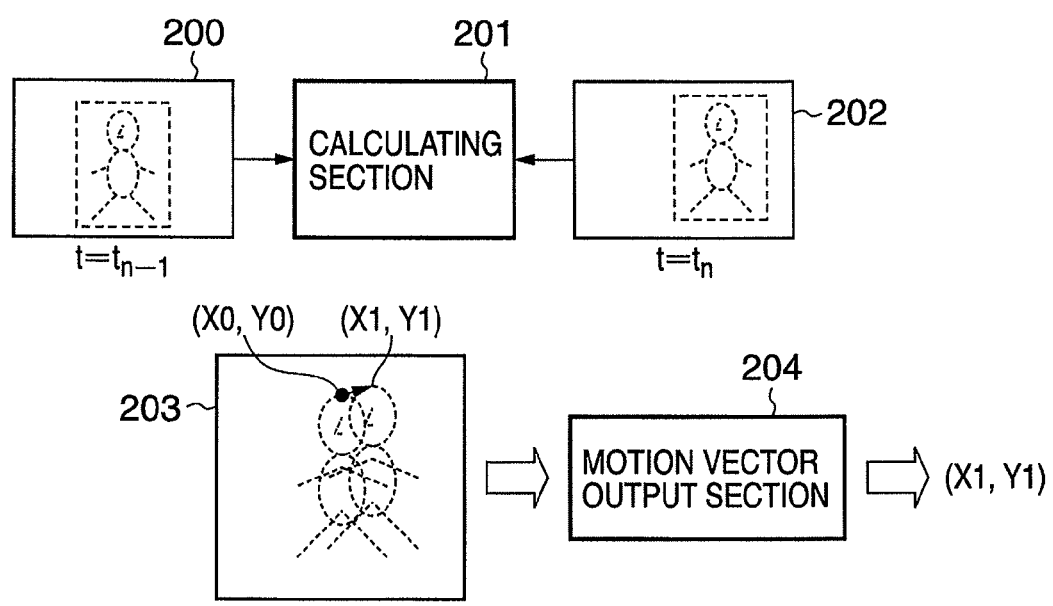
FIG. 11 is a configuration diagram of an electronic camera shake detecting device according to the conventional technology.
Figure 12:
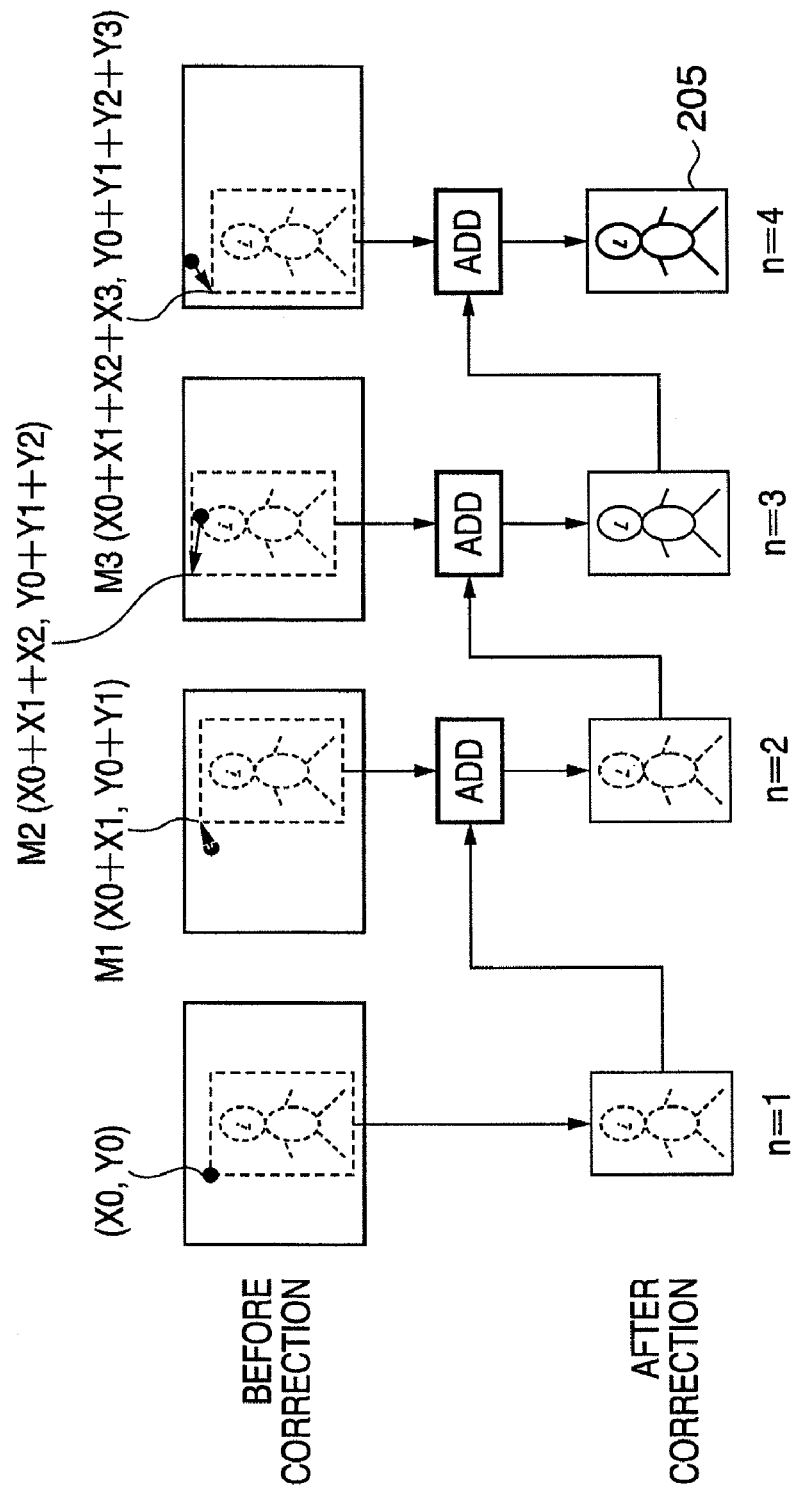
FIG. 12 is a diagram for illustrating the operation of an electronic camera shake detecting method according to the conventional technology.
Figure 13:
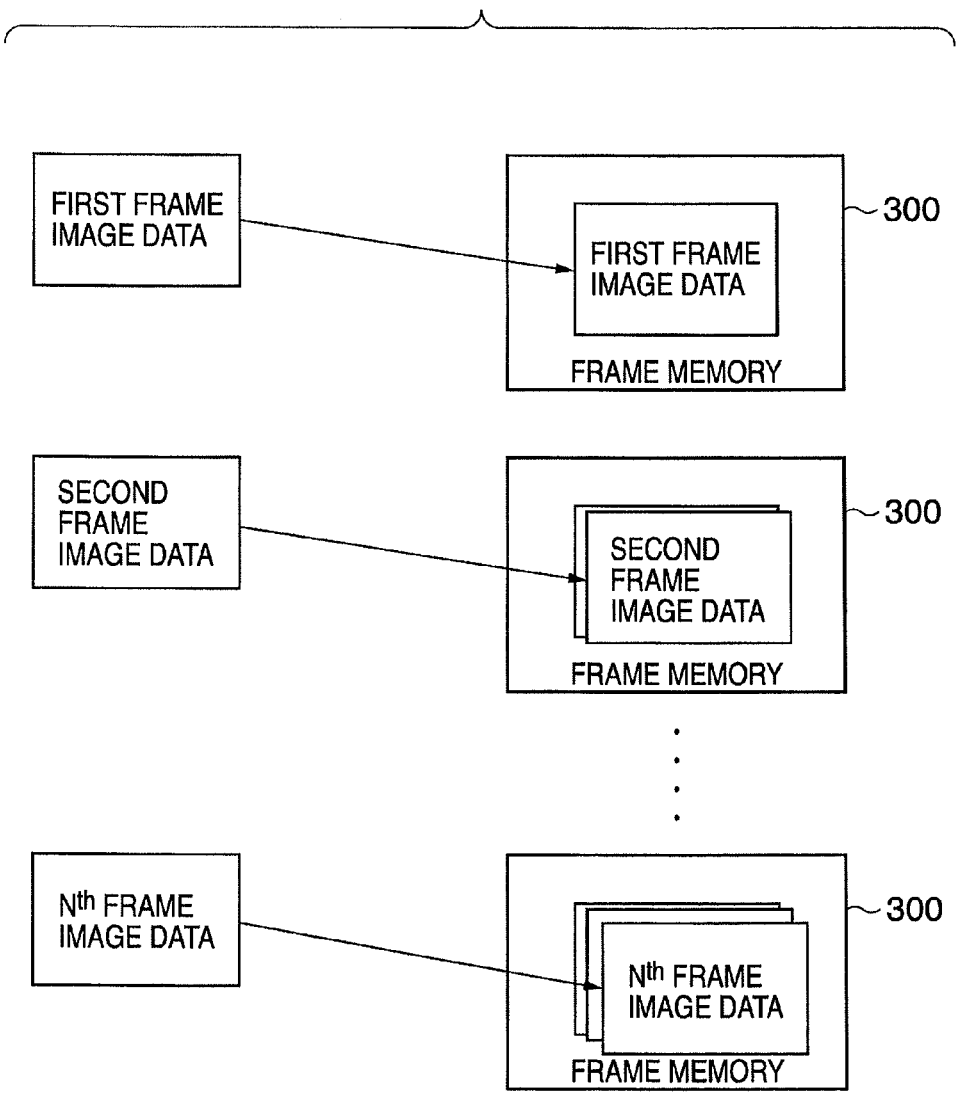
FIG. 13 is a diagram for illustrating the operation of an electronic camera shake detecting method according to the conventional technology.

In FIG. 10, the same components as those in the image sensing apparatus of Embodiment 1 in FIG. 1 are denoted by the same reference numbers, and a detailed description thereof has been omitted.

In FIG. 10, an object image that is incident via the imaging optics 1 is photoelectrically converted into an electric signal by an image sensor in the image sensing section 2. The A/D converting section 3 converts the image signal that has been output from the image sensing section 2 into digital image data. The signal processing section 4 includes a white-balance circuit, a gamma-correction circuit, a matrix-conversion circuit, and the like in order to convert the image data that has been output from the A/D converting section 3 into image data in a YUV data format. The image data that has been output from the signal processing section 4 is transmitted via the memory I/F 5 and temporarily stored in the memory section 6.

The image sensing apparatus in Embodiment 2 is provided with a mechanical camera shake detecting section 40, instead of the camera shake detecting section 9 in the image sensing apparatus in Embodiment 1. The mechanical camera shake detecting section 40 includes an acceleration detecting device, and a device, such as a gyroscope, that detects vibration (caused by camera shake and the like) of the image sensing apparatus based on mechanical/physical values and outputs the detection results. The mechanical camera shake detecting section 40 is attached to the image sensing apparatus itself. Thus, the mechanical camera shake detecting section 40 detects the shift amount and the shift direction of the image sensing apparatus. The information regarding the image data shift amount due to camera shake that has been obtained by the mechanical camera shake detecting section 40 is sent to the CPU 13. Based on this shift amount information, the window control section 7 generates the window Win-A for displaying a memory area in which the $N^{th}$ image data transmitted via the memory I/F 5 is superimposed in the synthesizing frame memory area 6-2 of the memory section 6. The window control section 7 also generates the window Win-B for displaying the entire area of the synthesized image data.

Based on the window information from the window control section 7, the synthesizing section 8 synthesizes image data that is stored in the frame memory area 6-1 set in the memory section 6 and image data that is stored in the synthesizing frame memory area 6-2. Then, the image data is rewritten to the synthesizing frame memory area 6-2 of the memory section 6 via the memory I/F 5. Accordingly, image data on which the camera shake correction has been performed is accumulated in the synthesizing frame memory area 6-2 of the memory section 6. The other operations are the same as those as in Embodiment 1, and thus a description thereof has been omitted.

In the description above, Embodiments 1 and 2 described in this specification are cited for illustrating one example of the present invention, and the embodiments of the present invention are not limited to those disclosed in this specification, as long as the present invention defined by the claims is achieved.

For example, in Embodiments 1 and 2, the signal level was adjusted in the adding process, after the $N^{th}$ image data and the image data read out from the window Win-B were added. However, it is also possible to add the image data after adjusting the signal level of each data.

Furthermore, in Embodiments 1 and 2, in the window control, memory areas were expressed as an image, and the window areas were expressed using the coordinates. However, it is also possible to express the window areas directly using the addresses of the memories.

Also, the object of the present invention may be achieved by supplying a storage medium storing a software program code that realizes the functions of the foregoing embodiments to a system or an apparatus. More specifically, the object of the present invention is achieved when the program code stored in the storage medium is read out and executed by a computer (or a CPU, or an MPU) of the system of the apparatus. In this case, the program code itself read out from the storage medium realizes the functions of the foregoing embodiments, and the storage medium storing the program code constitutes the present invention.

Various items can be used as the storage medium for supplying the program code. For example, flexible disk, hard disk, optical disk, magnetic optical disk, CD-ROM, CD-R, magnetic tape, nonvolatile semiconductor memory card, ROM, or the like may be used.

The functions of the foregoing embodiments may be realized by the computer executing the program code that has been read out. This also includes an embodiment in which based on the instructions of that program code, an OS (operating system) or the like operating on the computer performs part or all of the actual processes, and the functions of the foregoing embodiments are realized by those processes.

Furthermore, the program code read out from the storage medium may be written to a memory provided in a function expansion board inserted in the computer or a function expansion unit connected to the computer. This also includes an embodiment in which after the program code is written to the memory, based on the instructions of that program code, a CPU or the like provided in that function expansion board or function expansion unit performs part or all of the actual processes, and the functions of the foregoing embodiments are realized by those processes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-155399, filed Jun. 2, 2006, which is hereby incorporated by reference herein in its entirety.

What is claimed is:

1. An image sensing apparatus, comprising:
  an image sensing unit configured to sense an object image and output image signals;
  a shift amount detecting unit configured to detect a shift amount between two image signals, from said image signals that are sequentially output by said image sensing unit;
  an image signal synthesizing unit configured to perform a level adjustment varying for each area of said two image signals that are to be synthesized and sequentially synthesize said two image signals based on detection results of said shift amount detecting unit, and generate a synthesized image signal that has been corrected by said shift amount;
  a memory unit configured to accumulate said synthesized image signal; and
  an area information generating unit configured to generate, in said memory unit, first area information indicating an area on which said image signal output from said image sensing unit is to be superimposed, and second area information indicating the entire area of said synthesized image signal in said memory unit, based on the detection results of said shift amount detecting unit,
  wherein when the number of shootings is taken as N (where N is a positive integer), said image signal synthesizing unit:
  performs said level adjustment in which said synthesized image signal accumulated in said memory unit is multiplied by N/(N−1), in an area that is inside the area indicated by said second area information and outside the area indicated by said first area information;
  performs said level adjustment in which said image signal output from said image sensing unit is multiplied by N, in an area that is inside the area indicated by said first area information and does not overlap with said synthesized image signal accumulated in said memory unit; and
  synthesizes said image signal output from said image sensing unit and said synthesized image signal, in an area that is inside the area indicated by said first area information and overlaps with said synthesized image signal accumulated in said memory unit.

2. A control method of an image sensing apparatus, comprising:
  an image sensing step adapted to sense an object image and output image signals;
  a shift amount detecting step adapted to detect a shift amount between two image signals, from said image signals that are sequentially output in said image sensing step;
  an image signal synthesizing step adapted to perform a level adjustment varying for each area of said two image signals that are to be synthesized and sequentially synthesize said two image signals based on detection results in said shift amount detecting step, and generate a synthesized image signal that has been corrected by said shift amount;
  an accumulating step adapted to accumulate said synthesized image signal in a memory unit;
  an area information generating step adapted to generate, in said memory unit, first area information indicating an area on which said image signal output in said image sensing step is to be superimposed, and second area information indicating the entire area of said synthesized image signal accumulated in said accumulating step, based on the detection results in said shift amount detecting step,
  wherein when the number of shootings is taken as N, in said image signal synthesizing step:
  said level adjustment is performed in which said synthesized image signal accumulated in said accumulating step is multiplied by N/(N−1), in an area that is inside the area indicated by said second area information and outside the area indicated by said first area information;
  said level adjustment is performed in which said image signal output in said image sensing step is multiplied by N, in an area that is inside the area indicated by said first area information and does not overlap with said synthesized image signal accumulated in said memory unit; and
  said image signal output in said image sensing step and said synthesized image signal are synthesized, in an area that is inside the area indicated by said first area information and overlaps with said synthesized image signal accumulated in said memory unit.

* * * * *